United States Patent [19]

Geary

[11] Patent Number: 4,846,507
[45] Date of Patent: Jul. 11, 1989

[54] CASING CONNECTOR

[75] Inventor: George B. Geary, 5711 Sugar Hill #16, Houston, Tex. 77057

[73] Assignee: George B. Geary, Houston, Tex.

[21] Appl. No.: 585,129

[22] Filed: Mar. 1, 1984

Related U.S. Application Data

[63] Continuation of Ser. No. 269,559, Jun. 1, 1981, abandoned.

[51] Int. Cl.[4] ............................................. F16L 15/00
[52] U.S. Cl. ..................................... 285/27; 285/334
[58] Field of Search ............... 285/334, 333, 390, 355, 285/27

[56] References Cited

U.S. PATENT DOCUMENTS

| | | |
|---|---|---|
| 1,236,145 | 8/1917 | Burns . |
| 1,594,579 | 8/1926 | Timbs et al. . |
| 1,993,269 | 3/1935 | Fletcher ............................ 29/148.2 |
| 2,177,100 | 10/1939 | Frame ................................ 285/146 |
| 2,181,343 | 11/1939 | Reimschissel ...................... 285/146 |
| 2,196,966 | 4/1940 | Hammer ............................. 285/333 |
| 2,211,179 | 8/1940 | Stone ................................. 285/146 |
| 2,239,826 | 4/1941 | Neuhaus ............................ 285/146 |
| 2,258,066 | 10/1941 | Oyen .................................. 285/146 |
| 2,258,913 | 10/1941 | Stone ................................. 113/112 |
| 2,262,210 | 11/1941 | Stone ................................ 29/148.2 |
| 2,289,271 | 7/1942 | Kane et al. ......................... 285/146 |
| 2,553,836 | 5/1951 | Stone ............................. 285/334 X |
| 2,909,380 | 10/1959 | Hoye et al. ........................ 285/333 |
| 2,915,322 | 12/1959 | Dunlop ......................... 285/333 X |
| 2,917,822 | 12/1959 | Boice ................................... 29/447 |
| 2,980,451 | 4/1961 | Taylor et al. .................. 285/333 X |
| 3,047,316 | 7/1962 | Wehring et al. .................... 285/334 |
| 3,054,628 | 9/1962 | Hardy et al. ..................... 285/332.3 |
| 3,067,593 | 12/1962 | McCool .................................. 64/1 |
| 3,080,179 | 3/1963 | Huntsinger ..................... 285/333 X |
| 3,146,611 | 9/1964 | Fox ......................................... 64/1 |
| 3,219,397 | 11/1965 | Heldenbrand et al. ................ 308/4 |
| 3,388,752 | 6/1968 | Hanes et al. ......................... 173/131 |
| 3,784,238 | 1/1974 | Chance et al. ...................... 285/286 |
| 3,848,421 | 11/1974 | O'Brien et al. ..................... 61/72.3 |
| 3,856,337 | 12/1974 | Ehm et al. ........................... 285/334 |
| 4,121,862 | 10/1978 | Greer ................................... 285/333 |
| 4,127,927 | 12/1978 | Hauk et al. .................... 285/333 X |
| 4,192,533 | 3/1980 | Blose ................................... 285/334 |
| 4,194,031 | 3/1980 | Cullum ............................... 285/333 |
| 4,373,754 | 2/1983 | Bollfrass et al. .................... 285/334 |

OTHER PUBLICATIONS

Armco Seal-Lock Tubing, Oil and Gas Journal, Sep. 30, 1963.
Hunting Oilfield Services (UK) Limited, "Swift Connector" (Flyer).

Primary Examiner—Thomas F. Callaghan
Attorney, Agent, or Firm—Arnold, White & Durkee

[57] ABSTRACT

A box end casing connector is disclosed for use in connecting a string of casing sections for use in oil and gas drilling operations. The box connector is provided with an inside surface conventionally threaded with API standard threads and adapted to receive a pin member with mating threads. The pin member utilized is the threaded end of a subsequent casing section. The box connector is adapted to be integrally welded to the casing section and is further provided with a tapered shoulder and an externally beveled face to facilitate movement of the casing connector into and out of the bore of a restricted diameter blowout preventer.

7 Claims, 1 Drawing Sheet

U.S. Patent
Jul. 11, 1989
4,846,507
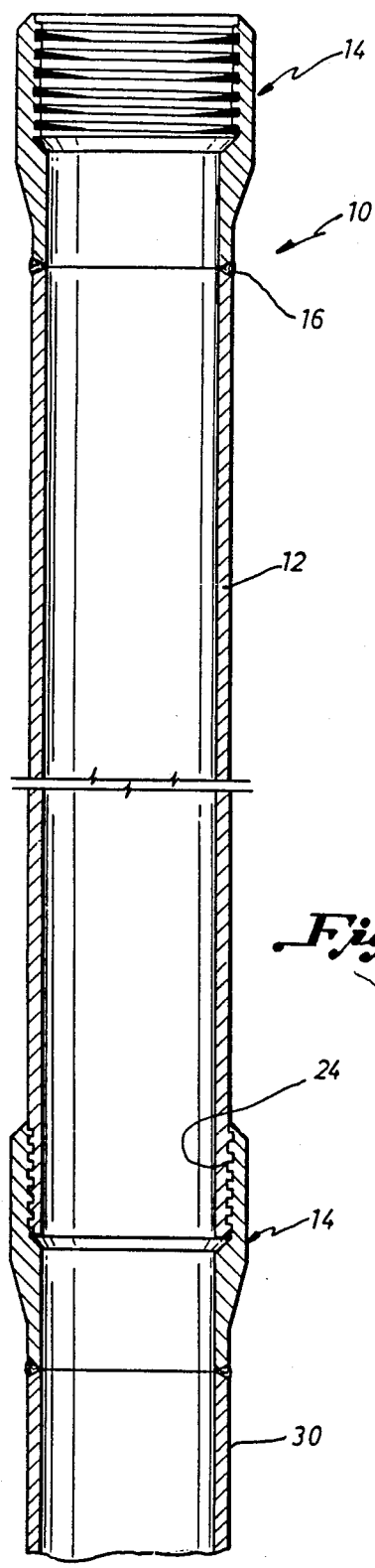
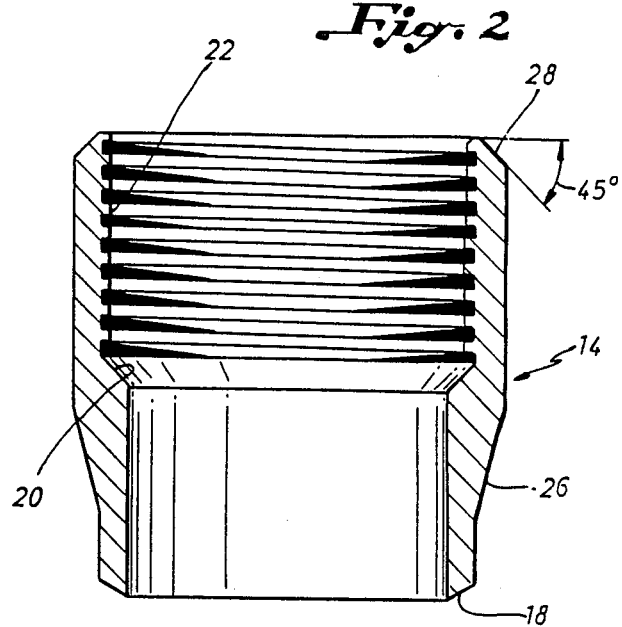
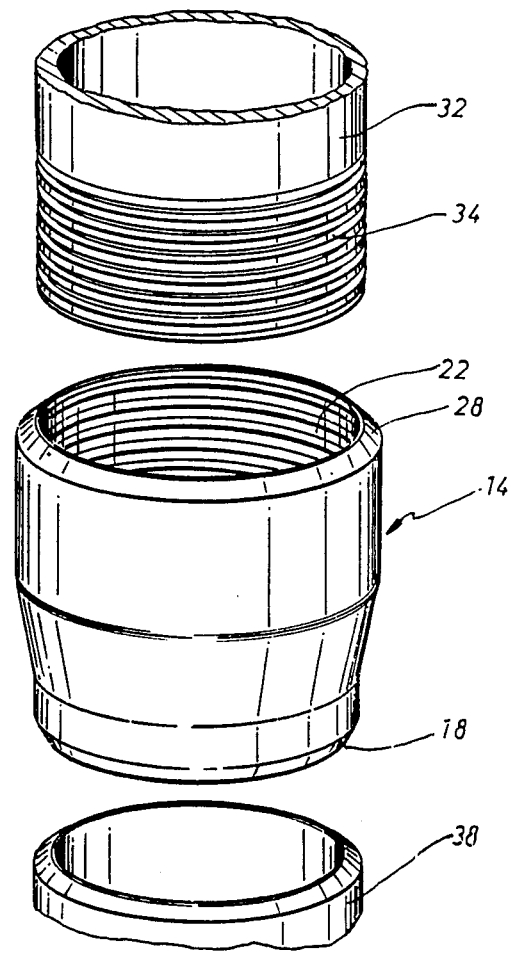

CASING CONNECTOR

This is a continuation of application Ser. No. 269,559, filed June 1, 1981, and now abandoned.

BACKGROUND OF THE INVENTION

The present invention relates to connectors for oil well casing and more specifically to a box end connector.

Presently in the oil and gas drilling industry large diameter casing is utilized to support borehole walls of the well. Casing sections making up a casing string are joined either by standard API couplings or welded on pin and box connectors with a specialized thread.

The standard API coupling is a short (10" or less) piece of pipe threaded at both ends on the inside diameter. This coupling is used to join two sections of casing which are threaded both ends with threads mating to the coupling.

The connector type devices are mating pins and boxes which are welded to opposite ends of each section of casing. Current connectors on the market are differentiated by specialized thread forms, each of which is not compatible with API threads nor are they interchangeable with each other.

The standard API couplings have several drawbacks most notably of which is the threaded make-up on both sides of the coupling. With two made-up threads between each section of casing the potential for thread leakage, or improper make-up, is doubled. Additionally standard couplings have square shoulders and these shoulders hang up on the restricted borehole of the blowout preventer when running the casing in a well. The same problems exists if the casing must be pulled out of the well, for it must pass through the same blowout preventer. The hanging up of the couplings causes delay in running the pipe and is potentially dangerous to the pipe and running equipment.

Where specialized connectors are used the outside diameter of most connectors is larger than the standard borehole of the blowout preventer and either the preventer must be removed while running the casing or an oversized preventer installed with a lower pressure rating. In either case the practice is less safe than using the standard blowout preventer.

SUMMARY OF THE INVENTION

The present invention provides an apparatus for connecting sections of casing for use in oil or gas well drilling operations. The connector is a box connector which eliminates the need for threading both ends of the casing section and structurally facilitates movement of the casing section into and out of the bore of a standard blowout preventer.

The box connector of the present invention provides a means for connecting casing having a diameter greater than 13 inches. The box connector is integrally attached to one end of the casing section. In the preferred embodiment attachment of the box connector is accomplished by welding to one end of the casing section. The box connector of the present invention includes a threaded end wherein the threaded end includes an externally beveled face to facilitate pulling the casing through a restricted diameter blowout preventer.

In the preferred embodiment the bevel is at an angle of 45° and the threaded end includes a plurality of API standard threads. Further, in the preferred embodiment the external outside diameter of the box connector includes a tapered shoulder for self centering the connector while running the casing through a restricted diameter blowout preventer.

A casing section is also provided in accordance with the present invention to be used in drilling operations. The casing section includes a first conventionally threaded end and a second end to which is integrally attached the aforesaid box connector having a receiving threaded section with threads complementary to the threads of the first end.

The box connector is welded to one end of the casing thereby being integral therewith. The box connector further includes a threaded end having an external face beveled to facilitate pulling the casing section through a restricted diameter blowout preventer.

BRIEF DESCRIPTION OF THE DRAWINGS

FIG. 1 is a side elevational view of a string of casing sections connected with a box connector in accordance with the present invention;

FIG. 2 is an enlarged view of the box connector illustrated in FIG. 1; and,

FIG. 3 is a pictorial view of the box connector and casing sections.

DETAILED DESCRIPTION

Referring now to the drawings and more specifically to FIG. 1 where a casing string 10 is illustrated. The casing string 10 includes a plurality of casing sections 12 interconnected with a box connector 14.

The casing sections 12 connected with the box connector 14 in the preferred use are of a large diameter greater than 13 inches. The casing sections 12 are fabricated so as to be conventionally threaded at one end and beveled at the opposite end to facilitate welding on of the box connector 14 at the other end. The casing section 12 thus becomes integral with the box connector 14.

Referring now to FIG. 2 in conjunction with Figure 1 where the box connector 14 is illustrated in an enlarged view. The box connector 14 is provided with a bevel surface 18 to facilitate welding of the box connector 14 to the casing section 12 illustrated in FIG. 1.

The box 14 has an internal surface 20 that is threaded with API standard buttress or eight round threads 22. The threaded surface 20 of the box connector 14 are tapered with respect to the longitudinal axis of the casing section 12 and are adapted to receive the complementing threads 24 of the casing section 12.

During oil or gas drilling operations a casing string such as casing string 10 is placed in the well to support the side walls of the well. In most drilling operations the casing string must be run into the well through a blowout preventer having a restricted diameter. The function of the blowout preventer is to prevent a well blowout in the event the bottom hole pressure overcomes the hydrostatic pressure of the well fluid. The problems introduced by the use of the blowout preventer include difficulty in passing the casing string 10 through the blowout preventer and aligning the larger outside diameter connectors as they move through the preventer.

The box connector 14 of the present invention facilitates the movement of the casing string 10 into a blowout preventer by utilizing an external surface with a tapered shoulder 26. The tapered shoulder 26 provides for self-alignment of each casing connector 14 through the blowout preventer.

The box connector 14 in the present invention also includes a bevel 28 on the face of the connector for self centering the connector 14 in the event the casing string must be pulled out of the well and through the restricted bore of the blowout preventer. The bevel 28 in the preferred embodiment is at an angle of 45°.

FIG. 3 is an exploded pictorial view of the box connector 14 and its relationship to a first casing section 30 and a second casing section 32. The casing sections 30 and 32 are similar to the casing section 12 illustrated in FIG. 12 making up the casing string 10.

The box connector 14 is positioned so as to be integrally fit to the casing section 30. This fitting may be performed by a welding process as illustrated in FIG. 1. Thus, the box connector 14 becomes integral with the casing section 30. During the formation of the casing string 10 a second casing section 32 provided with a plurality of threads 34 on its external surface is rotatably inserted into the box connector 14. Thus, the casing section itself is the pin member in the box pin connection. The section 32 is provided with threads that are API standard and complement the threads found in the internal surface 20 of the box connector 14. The interconnection of casing section 32 with the box connector 14 is achieved such that the external face 28, beveled as illustrated in FIG. 2, extends outwardly from the external surface of the casing section 32. Thus, the bevel 28 provides the self-alignment needed to facilitate movement of the casing section 30 out of the borehole and through the blowout preventer.

While the present invention has been described and illustrated with respect to a specific embodiment it will be understood to those skilled in the art that changes and modifications may be made without departing from the spirit and scope of the invention as set forth in the appended claims.

What is claimed is:

1. A casing section for use in wells for supporting borehole walls, said casing comprising:
   a casing segment of uniform inside diameter, said casing segment having a first casing end and a second casing end, said first end having a mating pin end; and
   a box connector having first and second box ends, the first box end configured to form an outwardly tapered external shoulder, said first box end beginning in a generally smooth, continuous extension of the casing segment where said first box end is integrally welded to the second casing end, and the second box end having internal threads configured to receive the mating pin end of a like casing segment, a portion of which second box end has an external surface with an outside diameter greater than the outside diameter of the casing segment, said second box end also having an externally beveled face forming a generally continuous external surface of diminishing outside diameter beginning at a point on the external surface spaced from the face of the second box end and ending at a point flush with the first casing end of a like casing segment, said externally beveled face of the second box end and the tapered shoulder formed on the external surface being configured to facilitate movement of one or more of the casing sections in either direction as the casing sections pass through an area of restricted diameter; said box connector, casing segment and mating pin end all being of uniform interior diameter so as to form full bore casing sections having a uniform interior diameter.

2. A casing section for use in wells for supporting borehole walls, comprising:
   a casing segment having a generally uniform inside and outside diameter, said casing segment also having a first casing end having a mating pin end with a generally uniform inside diameter equivalent to that of the casing segment and a second casing end;
   a box connector having a generally uniform inside diameter equivalent to that of the casing segment in any unthreaded portion thereof and having first and second box ends, the first box end being integrally mated to the second casing end and configured to form a generally smooth, continuous extension of the casing segment when said first box end is integrally mated to the second casing segment so as to form a continuous full bore when two such like casing sections are joined and a portion of said second box end having an external surface being connected to the first box end by an externally tapered shoulder and said second box end having an externally beveled face forming a generally continuous outside surface of diminishing outside diameter beginning at a point on the outside diameter of said external surface and spaced from the face of the second box end and ending at a point generally flush with the first casing end of a like casing segment, said externally beveled face and said tapered shoulder being configured to facilitate movement of one or more of the casing sections in either direction as the casing sections pass through an area of restricted diameter.

3. A casing section according to either of claims 1 or 2 wherein said externally beveled face is at an angle of approximately 45°.

4. A casing section according to claim 1 or 2 wherein said internal threads comprise a plurality of API standard threads.

5. A casing section of claims 1 or 2 having an inside diameter greater than about thirteen inches.

6. A casing section for use in wells for supporting boreholes comprising a first end having a pin end externally threaded for connection to a string of like casing sections and a second end having a box connector welded to be integral therewith, said box connector having internal threads, said threads comprising API standard threads complementary to the threads of said pin end for mating therewith and said box connector comprising an external upset including a tapered shoulder at one end and an externally beveled face having a slope of approximately 45° on the other end, said beveled face being contoured to end at a point generally flush with a like casing section to which the box connector is mated, the internal unthreaded surfaces of said box connector, pin end and casing section having a uniform interior diameter whereby a string of such casing sections has a uniform bore.

7. A casing section for use in wells for supporting boreholes comprising a first end having a pin end externally threaded for connection to a like casing section and a second end having a box connector attached to be integral therewith, said box connector having internal threads, said threads comprising API standard threads complementary to the threads of said pin end for mating therewith and said box connector comprising an external upset including a tapered shoulder at one end and an externally beveled face having a slope on the other end, said beveled face being contoured to end at a point generally flush with a like casing section to which the box connector is mated, the internal unthreaded surfaces of said box connector, pin end and casing section having a uniform interior diameter whereby a string of such casing sections has a uniform bore; and the slope and contour of said beveled face being configured to facilitate movement of two or more of the casing sections in either direction as the casing sections pass through areas of restricted diameter.

* * * * *